J. F. PETERSON.
SILO.
APPLICATION FILED JAN. 27, 1916.
1,281,201.
Patented Oct. 8, 1918.
3 SHEETS—SHEET 1.
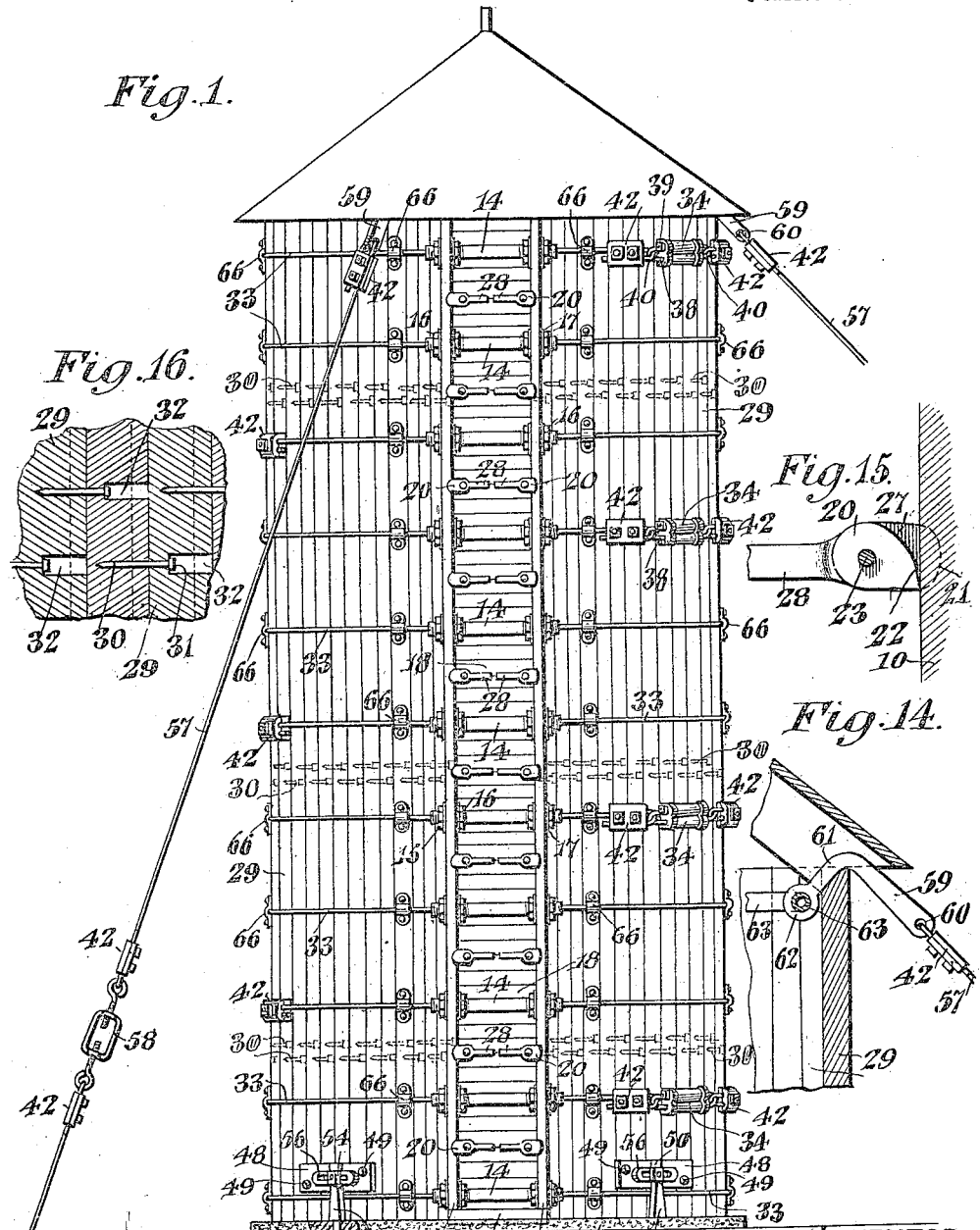
WITNESSES:
INVENTOR
J. F. Peterson,
BY
Attorney

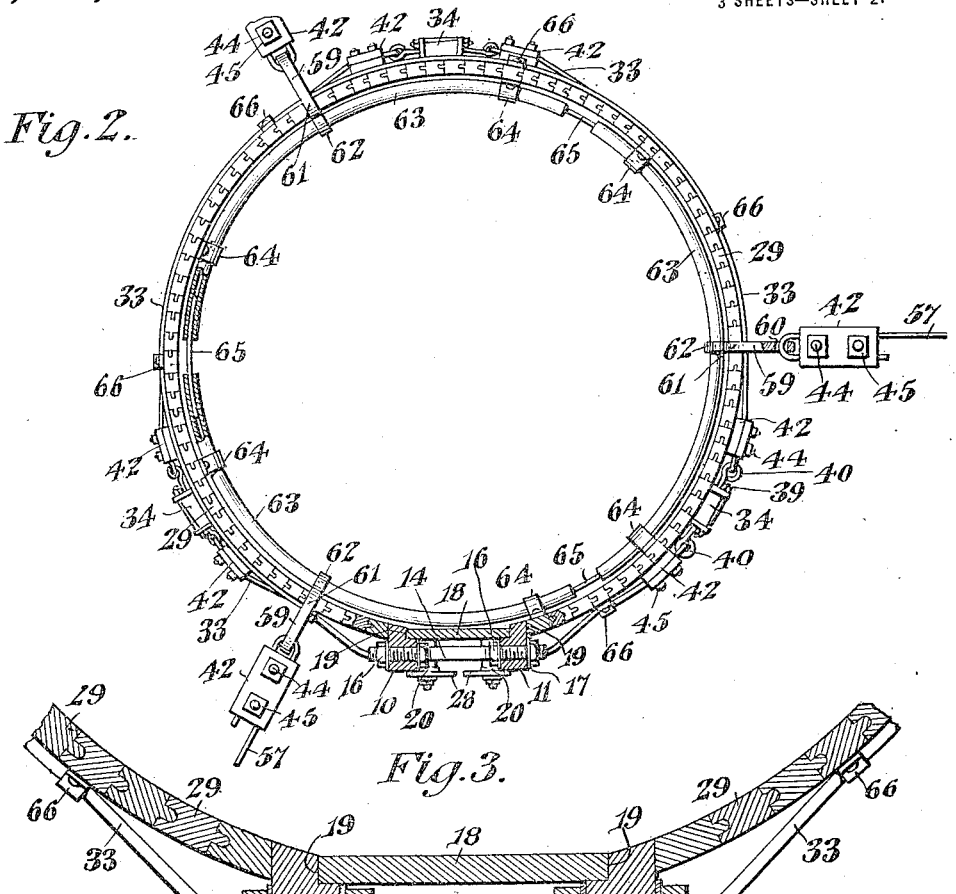
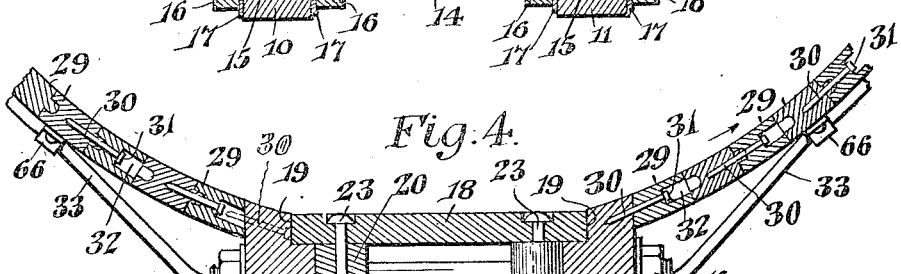

J. F. PETERSON.
SILO.
APPLICATION FILED JAN. 27, 1916.
1,281,201.
Patented Oct. 8, 1918.
3 SHEETS—SHEET 3.
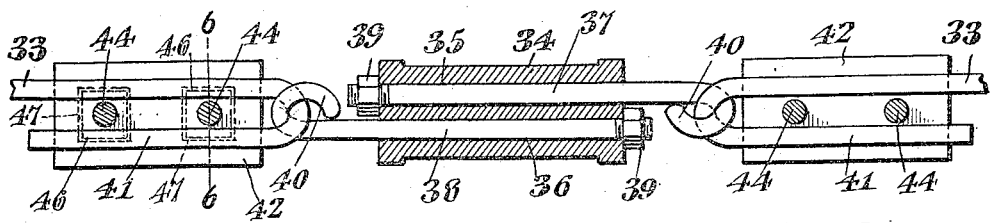
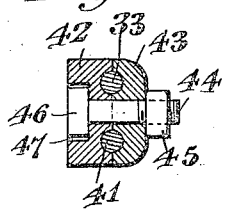
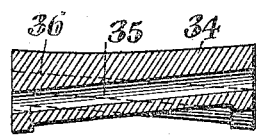
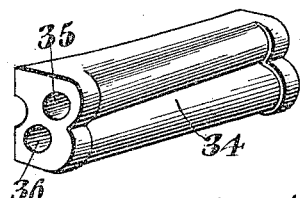
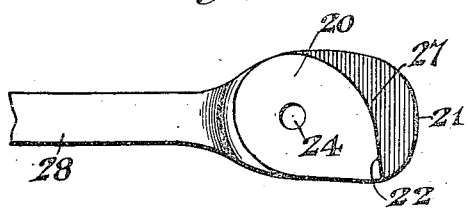
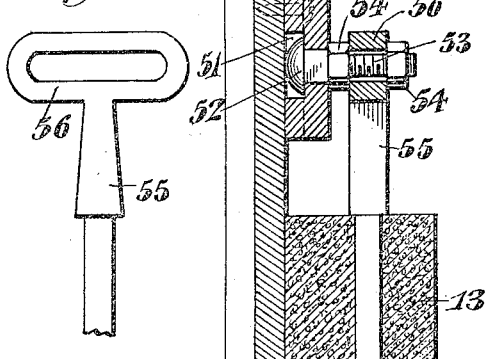
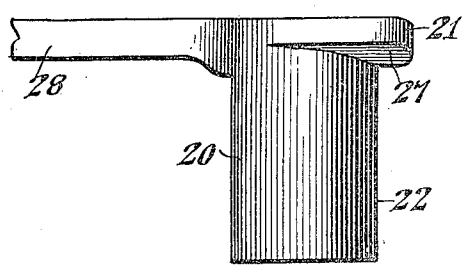
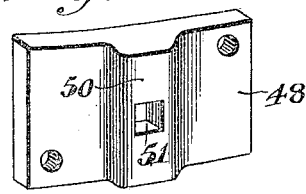
WITNESSES:
J. F. Peterson, INVENTOR
BY
Attorney

UNITED STATES PATENT OFFICE.

JOHN F. PETERSON, OF NEW DECATUR, ALABAMA.

SILO.

1,281,201.  Specification of Letters Patent.  Patented Oct. 8, 1918.

Application filed January 27, 1916. Serial No. 74,634.

*To all whom it may concern:*

Be it known that I, JOHN F. PETERSON, a citizen of the United States, residing at New Decatur, in the county of Morgan and State of Alabama, have invented a new and useful Silo, of which the following is a specification.

The present invention relates to silos, and has for an object to provide an improved construction, and an improved arrangement of the parts of a silo, whereby an economical strong, and durable structure is produced, which may be easily and quickly erected, and which may be adjusted to take up expansion and contraction, owing to climatic and other temperature changes, which effect the relation of the various parts of the silo.

Another object of this invention is to provide a silo with a practically continuous and smooth interior surface entirely around the inner wall thereof, and from top to bottom, to provide an improved anchoring means for securing not only the lower end or base of the silo to the ground, but to also secure, by guy wires, the upper end of the silo from tilting or any tendency to upset; to provide the silo with an improved frame and body construction, whereby the improved device may be built up from relatively small staves, such as staves of four inches in width, and wherein the body of staves is held in its true cylindrical form by means of bands or hoops encircling the body and passing through the frame, and being provided with improved tensioning means suitably distributed about the body, so as to prevent the crushing of the body out of its true cylindrical contour.

The invention has for a further object to provide the main frame with a plurality of interchangeable and detachable doors, adapted to fit into the inner side of the frame and form a continuation of the uninterrupted inner surface of the silo, and provided with improved one piece fasteners carried by the doors and engaging the outer side of the frame, irrespective of the thickness thereof, to bind the doors in position and provide spaced steps in the frame; to provide the frame of the silo with reinforcing or strengthening tubes, which serve also as steps, and further as housings and retaining devices for the horizontal hoops or loops, which are passed around the body of the silo, the tubes forming trusses for the frame, and being spaced vertically therein at points intermediate the locks of the door sections, so as to provide therewith a row of equi-distantly spaced apart steps from top to bottom of the frame.

In general, it is the aim of the present invention to provide a simplified structure, which may be erected without the use of scaffolding, fastening strips, or other surrounding or super-structures, which are usually employed, and found essential in the erection of silos; and to provide a construction which possesses all of these advantages and which at the same time is susceptible to relatively small expansion and contraction, although having a body portion of wood.

The above and other objects and advantages of this invention will be more particularly brought out in the following specific description of the present preferred embodiment of this invention, the same being illustrated in the accompanying drawings, wherein—

Figure 1 is a front elevation of a silo, constructed in accordance with the features of this invention, the various parts of the silo being enlarged and out of proportion, in order to clearly illustrate the specific forms thereof.

Fig. 2 is a top plan view of the silo having the cover or roof removed.

Fig. 3 is a detail enlarged horizontal sectional view through the front of the silo, taken through one of the combined bracing tubes and hoop housings, and showing the relation of the frame to the stave body and to the brace.

Fig. 4 is a similar view, taken horizontally through the door securing means, showing a door locked in position, and showing the relation of the one piece fastener with respect to the door, and the outwardly projecting frame.

Fig. 5 is an outer side elevation, enlarged, of the connection used to join the ends of the loops encircling the body, parts of the figure being shown in section.

Fig. 6 is a detail transverse sectional view through one of the clamping members, taken on the line 6—6 of Fig. 5, and showing the looped end of one of the hoops clamped in the device.

Fig. 7 is a horizontal sectional view through the tensioning block, which is used in the loop connection, the section being taken through one of the I-bolt receiving openings, and showing the curvature of the inner face of the tension block.

Fig. 8 is a detail perspective view of the tension block, showing the outer side and one end thereof.

Fig. 9 is an inner elevational view of one of the clamps employed for securing the door sections in the frame.

Fig. 10 is a top plan view of the same.

Fig. 11 is a detail vertical sectional view through the lower end of the silo, at one side thereof, showing the improved anchoring plate and post for securing the base of the silo to the foundation.

Fig. 12 is a detail front elevational view of the upper end of the anchoring post.

Fig. 13 is a detail perspective view, showing the outer face of the anchoring plate adapted for attachment against the outer side of the body.

Fig. 14 is a fragmentary vertical sectional view, taken through the top of the silo at one side thereof, showing the guy wire connection to the body of the silo.

Fig. 15 is a detail sectional view, showing the inner end of one of the clamping members in elevation, and showing the lip thereof in engagement with the side of the frame, the view also showing the stop shoulder in engagement with the frame to hold the clamping member from further rotation.

Fig. 16 is a vertical sectional view, taken edgewise through a number of the staves of which the body of the silo is constructed, and illustrating the manner of securing the staves together.

Referring to these drawings, wherein like parts are designated by similar numerals of reference throughout all of the views, it will be noted from Figs. 1, 2, 3 and 4, that the body of the silo is made up of a pair of vertical bars or rails 10 and 11, spaced apart and mounted at their lower ends upon a sill 12, which is suitably embedded in a foundation 13 of concrete, or the like. The side bars or rails 10 and 11 are held apart, and also from spreading, by a plurality of vertically spaced apart brace or truss tubes 14, each of which, as may be best seen from Fig. 3 of the drawings, projects at its opposite ends through suitably formed transverse openings 15 in the side bars 10 and 11, and being secured therethrough by means of opposed pairs of clamping nuts 16 engaging the inner and outer faces of the bars 10 and 11. Washers 17 are interposed between the nuts 16 and the bars 10 and 11, so as to prevent undue wear upon the side bars of the main frame of the silo. The openings 15 are of sufficient size to admit of the free longitudinal movement of the brace tubes 14 therethrough, so that the bars 10 and 11 may be adjusted toward or from each other to accommodate the frame to variations due to expansion and contraction of the silo. The opposite ends of the frame tubes 14 are left open for a purpose which will hereinafter appear.

The frame thus constructed is provided with a plurality of door sections 18, which are seated at their opposite lateral edges in rabbets 19 formed in the inner opposite corners of the bars 10 and 11, so as to countersink the door sections 18 in the frame and position the inner faces of the doors flush with the inner wall of the frame. Each door section 18, is held in place by a pair of clamps 20. With reference to Figs. 9 and 10, each of the clamps 20 comprises a substantially cylindrical body of relatively great length and depth to extend entirely across the inner side of the adjacent frame bar 10, as shown in Fig. 4, and to abut at its inner end against the door 18, while at its outer end is placed a lip 21 adapted to lap over the outer edge of the frame bar 10. It will be noted that at one side, the cylindrical body of the clamp 20, as shown in Figs. 9 and 15, is provided with an extension or elongation terminating in a flat face extending substantially tangentially to the body 20 to form a stop shoulder 22 adapted to bear against the inner face of the frame bar 10, when the clamp is turned into locking position, as shown to advantage in Fig. 15. The clamp 20 is secured for rotation against the outer face of the door 18 by means of a bolt 23 having its head preferably counter-sunk in the inner side of the door 18 and extending outwardly and centrally through an opening 24 formed centrally through the body of the clamp, the clamp being held upon the bolt by means of a nut 25, which is threaded on the outer end of the bolt and adapted to bind against a washer 26, which bears against the outer end of the body 20 of the clamp. As shown in Figs. 9 and 15, the lip 21 extends laterally from one side of the body only and merges at its lower end into the bottom of the stop shoulder 22, while its upper end merges into the body at substantially the point of mergence of the lateral elongation or projection of the body into the main cylindrical portion thereof. This structure is clearly shown in Figs. 9 and 10. From the latter figure, it will be noted that this lip 21 is provided with an inclined cam face 27, which recedes gradually from the stop shoulder 22 to the opposite end or side of the lip 21. The body 20 of the clamp is also provided with a laterally extending handle 28 projecting from the outer end of the body and from the side thereof diametrically opposite to the lip 21 and the stop shoulder 22, so that when the stop shoulder 22 is brought into contact against the inner face of the side bar 10 of the frame, as shown in Fig. 15, the handle 28 projects horizontally inwardly to provide a step. From Fig. 1, it will be noted that these clamps 20 are arranged in pairs, one at the lateral edge of each door 18, and that they are located intermediate the brace or truss tubes 14, so as to provide therewith a continuous line of steps upwardly between the bars throughout the entire height of the frame.

Secured to this frame is the body of the silo, and it is an aim of the present invention to provide a body of such construction that it may be made of relatively narrow staves, so that by the use of the narrow staves but little contraction or expansion takes place. As shown in Fig. 4, the body is built upon the frame, beginning at one side thereof, such as at the side bar 11 of the frame, and building the structure horizontally and progressively in the direction of the arrow indicated, to complete the cylindrical body. In this construction, the first stave 29 is placed edgewise against the frame bar 11, with its inner side flush with the inner edge of the frame bar, and a dowel pin 30 is driven through the outer edge of the stave 29 and into the adjacent outer side of the frame bar 11, as shown, so as to pin the stave to the frame bar. It will be noted that these dowel pins 30 are provided with heads 31 which are seated in counter bores 32 formed in the outer edges of the staves 29, so that the heads may be driven into the end of the counter bore by a set, or other suitable implement, used in constructing buildings. After the first stave 29 has been thus secured to the adjacent frame bar 11, the second stave is placed edgewise against the first, and a second dowel pin 30 is driven edgwise through the second stave and into the first, but, as shown in Fig. 16, is offset vertically, either upwardly or downwardly from the first dowel pin. This method of operation is carried on with each successive stave as it is brought into place, until the entire cylindrical body of the silo has been formed. As shown at the opposite side of Fig. 4, where the staves 29 have been multiplied sufficiently to form the entire cylindrical body, the end of the line of staves is shown as secured to the opposite side bar 10 of the frame. This is effected by abutting the last stave against the outer face of the frame bar 10, and driving the last dowel pin 30 outwardly through the frame bar 10 transversely thereof and edgewise into the last stave 29, so as to anchor the last stave to the frame bar 10. The staves 29 are preferably of the tongue and groove formation, as shown, so as to provide for a sealed wall or body entirely about the silo. It will be noted that the staves 29 are suitably beveled and rounded to conform to the desired cylindrical contour of the body and provide a smooth uninterrupted inner wall therefor, As shown in Fig. 1 of the drawings, in dotted lines, the dowel pins 30 are arranged in three staggered rows around the top, the bottom and the intermediate portions of the body, so as to secure and brace the staves together at different points throughout their lengths and effect a more solid and substantial structure. It is, of course, understood, however, that any number of rows of the dowel pins 30 may be employed.

The body of the silo is reinforced by a plurality of hoops 33, which entirely surround the body at suitably spaced apart points, as shown in Fig. 1, to hold the body from bursting open under excessive internal pressure, or from undue expansion or swelling of the body. These hoops 33 are each connected at their free ends to a tension block 34, whereby the ends may be contracted to bind the hoops 33 more or less against the body. To prevent distortion of the body, or undue pressure by the tightening of the hoops at any one side of the body, the tension blocks 34 are distributed around the body at the different sides, and against different staves, so as to more or less equalize the pressure of the tension blocks when the hoops 33 are tightened. This distribution of the tension blocks 34, and the spacing apart of the hoops 33 is clearly disclosed in Figs. 1 and 2 of the drawings.

In Fig. 5 of the drawings, there is disclosed to advantage one of the connections between the ends of the hoops 33, and wherein the tension block 34 of the connection is shown in section and as having vertically spaced apart horizontally extending openings 35 and 36, through which slidably extend, from the opposite ends of the tension block 34, a pair of eye-bolts 37 and 38. The eye-bolts 37 and 38 have threaded outer ends upon which preferably hexagonal nuts 39 are threaded and adapted to bear against the adjacent ends of the block 34. The nuts 39 are adapted to draw the eye-bolts 37 and 38 longitudinally through the tension block 34 to contract the hoop or band 33 about the body of the silo.

The inner ends of the eye-bolts 37 and 38 each have an eye or loop 40 thereon through which is passed the adjacent free end of the band 33, the same being returned upon itself, but in spaced relation thereto, as a 41. Each end of the band 33, thus looped, is engaged between the opposite plates 42 and 43 of a clamp. As shown in Figs. 5 and 6, the clamp comprises the base plate 42 adapted to lie against the outer side of the body of the silo, and has, in its outer face, a pair of vertically spaced apart recesses into which are seated the spaced portions 33 and 41 of the band or loop. The outer plate 43 of the clamp has longitudinal spaced apart recesses adapted to seat against the outer sides of the portions 33 and 41 of the band, and bind the latter in the cylindrical openings thus formed between the two plates 42 and 43. The plates are held together and clamped by means of a pair of bolts 44, which project outwardly through the plates and have clamping nuts 45 upon their outer ends to bear against the outer plate 43. The heads 46 of the bolts 44 are counter-sunk in angular pockets or recesses 47 formed in the inner face of the clamping plate 42 for the purpose of first permitting the clamp to lie flat against the outer face of the body of the silo, and second to hold the bolts 44 from turning when submitted to torsional strain, during the tightening of the nuts 45 thereon.

Each tension block is of the form shown to advantage in Fig. 8, or is in the form of a pair of substantially cylindrical members which are made in one piece, and which have the axes of the openings 35 and 36 extending tangentially in opposite directions from the body of the silo, so that the planes of the longitudinal axes of the openings intersect, as shown to advantage in Fig 7. Thus, each eye-bolt, 37 and 38, extends outwardly at a tangent from the side of the silo, and the tightening nut 39 thereon exerts a direct straight line pull upon the end of the band 33 to which the adjacent eye-bolt is connected. Such an arrangement or inclination of the openings 35 and 36 provides sufficient space between the outer face of the body and the clamping nuts 39 to admit of the free operation or turning of the same.

The body of the improved silo is anchored, at intermediate or spaced apart points about the bottom thereof, to the cementitious foundation 13. This means comprises an anchoring device consisting of a plate 48 adapted for securement by means of screws 49, or the like, against the outer side of the body, and across at least two of the staves 29 of the body. The plate 48 is provided intermediate its lateral edges with an outstanding bead 50 for the purpose of reinforcing and thickening the central portion of the plate, which is provided intermediate its upper and lower ends with a socket 51 in the rear face of the plate for the reception of the head 52 of a connecting pin 53, which projects outwardly through the bead 50 in a horizontal direction. This pin 53 is provided with spaced apart clamping nuts 54 threaded for longitudinal adjustment upon the pin 53. A post 55 comprises the opposite member of the anchoring device, and is embedded in the foundation 13 of cementitious material, so as to securely hold the post 55 from upward or lateral movement. The upper end of the post 55 is provided with a relatively flat horizontally extending loop 56, forming a substantially T-shaped head on the upper end of the post 55, having a longitudinal slot therein. The slot is of sufficient width to receive freely therethrough the pin 53, and the nuts 54 are adapted to bind against the opposite sides of the loop 56, so as to hold the anchoring plate from movement laterally with respect to the post, but to admit of the free sliding of the pin 53 longitudinally of the loop in the expansion and contraction of the body of the silo. This anchoring device thus provides an efficient support to prevent the tilting or upsetting, or lateral displacement of the body, and at the same time admits of variations in its adjustment.

The top of the body is braced by means of guy wires 57 suitably anchored in the ground at preferably three sides of the silo, provided in their lengths with turn buckles 58, and connected at their upper ends to anchoring irons 59. The anchoring irons 59 are shown in the present instance as being three in number, and as being equi-distantly spaced apart circularly at the top of the body, the irons 59 having eyes 60 in their outer ends to receive the overturned extremities of the guy wires 57 the overturned ends of the guy wires being held in place by means of the clamp shown in Figs. 5 and 6, and which may be designated as 42. The upper ends of the anchoring irons are turned downwardly and inwardly at substantially right angles to the body portions thereof, and have such downturned angular portions, designated as 61, counter-sunk or mortised in the upper edge or edges of the adjacent staves 29 to hold the anchoring irons 59 from lateral displacement about the body. Large loops or eyes 62 are formed upon the inner ends of the angle portions 61 of the anchoring irons and are of sufficient size to receive freely therethrough a tube section 63, one for each anchoring iron. These tube sections 63 comprise the main elements of an interior ring, which bears against the inner wall of the body of the silo adjacent the top thereof, as for instance approximately two inches from the upper edges of the staves, to support the anchoring irons and distribute the pressure exerted by the guy wires 57 equally over the inner wall of the silo. The tubes 63, as may be best seen from Fig. 2, are mounted in straps 64 secured against the inner wall of the body, and which only loosely engage the tubes 63 to admit of the longitudinal sliding of the tubes in the straps when the staves are expanded or contracted in the adjustment of the body. The ends of the tubes are joined by means of connecting pins 65, which, as shown in section in Fig. 2, project considerably into each of the adjacent ends of the adjacent tubes, and which slide freely in one of the ends, so as to admit of the expansion and contraction of the upper anchoring ring.

The hoops 33 are loosely held against the sides of the body by means of straps 66 secured to the adjacent staves and through which the rings are free to slide, so as not to interfere with the adjustment of the same.

As shown in Figs. 1 and 3 particularly, the front portion of the hoop 33 passes through the hollow brace or truss tube 14, so as to protect the hoop at the front of the device and more closely unite the structure. At the same time, the passing of the loop through the tube admits of the relatively flat engagement of the hoop against the front of the silo, so that a more uniform pressure may be exerted when the hoop is drawn taut. The body is provided with a suitable roof 66. It will be noted that the guy wires 57 are secured to the opposite sides of the turn buckles 58 by means of the clamps 42 of Fig. 6, and also that wherever the overturned ends of wires are to be secured in loop form, the improved clamp 42 is employed.

In the construction of the frame at the front of the silo, the brace tubes 14 are spaced apart substantially thirty inches, and the clamps 20 of the door sections 18 lie substantially thirty inches apart, but are alternately arranged with the brace tubes so that steps are provided spaced apart substantially fifteen inches. The improved clamp is made in one piece and engages against the outer edge of the adjacent side bar of the frame, and is of such construction that it does not require the provision of keeper plates, cam blocks, or other devices usually employed, but acts directly against the frame bar to exert its outward pull upon the door, and thus bind the latter securely in the rabbets of the frame.

With the improved construction as above described, a new method of erecting silos is provided, wherein the silo is made up of a plurality of relatively narrow staves, which are secured successively to each other from one side of the main frame to the other, and which are peculiarly interlocked by the staggered rows of dowel pins, to hold the staves from lateral displacement, and to hold the body from spreading open after it is formed. The feature of distributing the tension blocks around all of the sides of the body prevents any undue pressure at any side of the body, so that the hooks may be tightened, but the pressures of the different hoops counter-act each other and serve to retain the body in its true cylindrical form and prevent the distortion or crushing of the same. The anchoring devices at the bottom admit of this adjustment of the body, as the horizontal loops 56 admit of the horizontal sliding of the pins 53 therethrough in the spreading or contraction of the staves. There may be any desired number of these anchoring devices used, but it is preferable to employ at least three of them. The anchoring ring in the top of the body is made up of sections or tubes with their ends spaced apart to admit of the easy expansion and contraction of the ring, the tubes being held in their true position by means of the coupling pins 65, which freely slide in one of the tube ends.

It is, of course, understood that various modifications and changes may be made in the above specifically described embodiment of the invention within the scope of the claims, without departing from the spirit of the invention.

What is claimed is:—

1. In a silo, a sectional body, a frame joining the sections of the body at the front thereof, means encircling the body and arranged relative to the frame for securely embracing the same, tube sections arranged interiorly of the body near the top thereof and having their meeting ends adjustably connected to each other, means securing the tubes in place, anchoring irons straddling the upper end of the body and engaged with the tubes, and guy cables connected with the anchoring irons and adapted to be permanently secured to a foundation.

2. In a silo, a sectional body, a frame joining the sections of the body at the front thereof, means encircling the body and arranged relative to the frame for securely embracing the same, tube sections arranged interiorly of the body near the top thereof and having their meeting ends adjustably connected to each other, means securing the tubes in place, anchoring irons straddling the upper end of the body and engaged with the tubes, guy cables connected with the anchoring irons and adapted to be permanently secured to a foundation, plates secured at intervals exteriorly of the body near the bottom, bolts mounted in said plates, and anchoring posts embedded in the foundation and having slotted substantially T-shaped heads adjustably receiving the bolts.

3. In a silo, a sectional body, a frame joining the sections of the body at the front thereof, means encircling the body and arranged relative to the frame for securely embracing the same, anchoring irons straddling the upper end of the body and secured interiorly thereof, adjustable guy cables connected with the anchoring irons and adapted to be permanently secured to a foundation, plates secured at intervals exteriorly of the body near the bottom, bolts mounted in said plates, and anchoring posts embedded in the foundation and having slotted substantially T-shaped heads adjustably receiving the bolts.

4. The combination with a silo body, of anchoring means comprising an expansible and contractible substantially circular member mounted within the upper end of the body, substantially L-shaped anchoring irons resting upon the upper end of the body and projecting both inside and outside the same, and connected with the said member so as to hold the same spaced from the inner wall of the body, and inclined guy cables connected at one end to said irons and at the other end to a foundation.

5. The combination with a silo body, of a base anchoring means rigidly mounted in a foundation and having heads provided with substantially horizontal slots, means connected with the said body and operating in the slots to hold the body upon the foundation and permit lateral expansion and contraction of said body, and other anchoring means connected with the upper end of said body and also with the foundation and independent of said base anchoring means.

6. The combination with a silo body, of a base anchoring means mounted in a foundation and having heads loosely connected with the silo body to hold the same upon the foundation and permitting lateral expansion and contraction of said body, and anchoring means mounted interiorly of the upper end of said body and extending outside of the same and adapted to be secured beyond the foundation for sustaining said body upon the latter and bracing the body against displacement in the base anchoring means.

In testimony, that I claim the foregoing as my own, I have hereto affixed my signature in the presence of two witnesses.

JOHN F. PETERSON.

Witnesses:
MARVIN R. RANKIN,
F. J. HOWELL.

Copies of this patent may be obtained for five cents each, by addressing the "Commissioner of Patents, Washington, D. C."